United States Patent [19]
Wolf

[11] 3,840,720
[45] Oct. 8, 1974

[54] THREE-PHASE TRANSFORMER-RECTIFIER ASSEMBLY FOR A WELDER

[76] Inventor: Edward Russell Wolf, 4651 Wolverine Dr., Saginaw, Mich. 48603

[22] Filed: Mar. 5, 1973

[21] Appl. No.: 337,813

[52] U.S. Cl............... 219/116, 321/26, 323/44 R
[51] Int. Cl........................................... B23k 9/10
[58] Field of Search...... 219/116, 108, 110; 321/26; 323/44 R

[56] References Cited
UNITED STATES PATENTS

| | | | |
|---|---|---|---|
| 2,922,026 | 1/1960 | Hauptmann | 219/116 X |
| 3,053,973 | 9/1962 | Simmie | 219/116 |
| 3,244,960 | 4/1966 | Stevens et al. | 323/44 R UX |
| 3,247,394 | 4/1966 | Lowrance | 323/44 R X |
| 3,495,067 | 2/1970 | Sciaky | 219/116 |
| 3,513,377 | 5/1970 | Koltuniak et al. | 321/26 |
| 3,745,440 | 7/1973 | Lord | 321/26 |

Primary Examiner—J. V. Truhe
Assistant Examiner—G. R. Peterson
Attorney, Agent, or Firm—Reising, Ethington & Perry

[57] ABSTRACT

A manually operated portable welding head is supplied direct current from a three-phase transformer-rectifier assembly comprising three identical single-phase transformer-rectifier assemblies. Each single-phase transformer-rectifier assembly includes an E-frame transformer core, a primary winding, and a secondary winding. Each of the secondary windings is provided with three terminals electrically connected to that secondary winding at the two ends and the center thereof. These terminals are spatially located substantially immediately adjacent the periphery of the secondary winding to which they are connected to thereby minimize the lengths of the conductors connecting that secondary winding with these terminals. Three diodes are electrically and mechanically connected to each of the terminals connected to the end of a secondary winding. A conductor bus is electrically connected to each of these eighteen diodes at the terminals thereof opposite their connections with the transformer terminals. A second conductor bus is connected with the three center tap terminals. Full-wave rectified three-phase voltage for the operation of the portable welding head is available at these conductor busses.

19 Claims, 6 Drawing Figures

THREE-PHASE TRANSFORMER-RECTIFIER ASSEMBLY FOR A WELDER

This invention relates to a transformer-rectifier assembly suitable to supply a manually operated direct current welder having a portable welding head.

Resistance welding techniques and apparatus are well known for use in fabrication processes. Aluminum and steel are, and have been, commonly welded by such techniques and with such apparatus. Additionally, it is well known in the prior art that resistance welding techniques can be practiced using manually operated portable welding heads; such portable welding heads provide an added dimension of flexibility in resistance welding, permitting the use of resistance welders on custom jobs and under other circumstances where fixed position welding is not satisfactory.

The salient feature of resistance welding is the high current common to such welding operations. Typical currents are measured in tens of thousands of amps, and even one hundred thousand amps is not uncommon. Efficiency considerations dictate the use of large conductors in resistance welding apparatus, and the prior art fully recognizes this requirement.

In view of the extreme current levels associated with resistance welding, small inductances yield troublesome voltage drops, which voltage drops are not adequately obviated in the prior art. The transformer-rectifier assembly of the present invention is directed specifically to inductive voltage drops, and such voltage drops are reduced to a minimum by the instant invention. In recognition of the problems attendant even small inductances, and in recognition of the inductances inherent in conductors, straight or otherwise, the instant invention provides for rectification at each secondary winding of a three-phase transformer-rectifier assembly at terminals spatially located substantially immediately adjacent the periphery of that secondary winding.

In the present invention, a manually operated portable welding head is supplied direct current from a three-phase transformer-rectifier assembly comprising three identical single-phase transformer-rectifier assemblies. Each single-phase transformer-rectifier assembly includes an E-frame transformer core, a primary winding, and a secondary winding. Each of the secondary windings is provided with three terminals electrically connected to that secondary winding at the two ends and the center thereof. These terminals are spatially located substantially immediately adjacent the periphery of the secondary winding to which they are connected to thereby minimize the lengths of the conductors connecting that secondary winding with these terminals. Three diodes are electrically and mechanically connected to each of the terminals connected to the end of a secondary winding. A conductor bus is electrically connected to each of these 18 diodes at the terminals thereof opposite their connections with the transformer terminals. A second conductor bus is connected with the three center tap terminals. Full-wave rectified three-phase voltage for the operation of the portable welding head is available at these conductor busses.

Further features and advantages of the present invention will be apparent from the following description taken in connection with the attached drawings in which.

Figure 1:
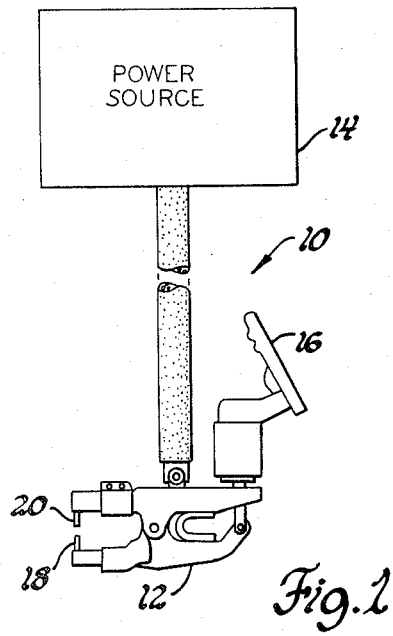
FIG. 1 illustrates a portable welding head supplied from a power source of a type in which the present invention is useful.

Reference should now be made to the drawings and more particularly to FIG. 1 illustrating a manually operated direct current welder generally designated 10 having a portable welding head 12 supplied from a power source 14. The portable welding head 12 includes a handle 16 and welding electrodes 18 and 20. Operator control of the welder 10 is effected in a conventional manner known in the art for the operation of manually operated welders of the type provided with portable welding heads.

Figure 2:
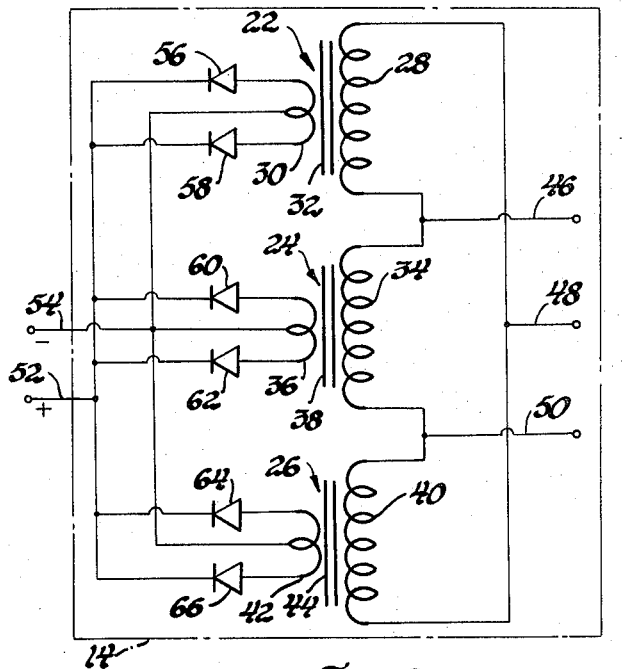
FIG. 2 is a circuit schematic of the three-phase transformer-rectifier of the present invention.

As shown in the schematic of FIG. 2, the power source 14 includes three single-phase transformers generally designated 22, 24, and 26. The single-phase transformer 22 carries a primary winding 28 and a secondary winding 30 on a transformer core 32; the single-phase transformer 24 carries a primary winding 34 and a secondary winding 36 on a transformer core 38; the single-phase transformer 26 carries a primary winding 40 and a secondary winding 42 on a transformer core 44. The primary windings 28, 34, and 40 are delta connected for excitation from a three-phase alternating current source, and lines 46, 48, and 50 provide connecting conductors to the delta connected transformer for this alternating current input.

A positive voltage line 52 and a negative voltage line 54 provide a direct current output from the power source 14 to the portable welding head 12; the voltage across lines 52 and 54 is full-wave rectified three-phase voltage. Six rectifiers 56, 58, 60, 62, 64, and 66 rectify the alternating current voltage on the secondary windings 30, 36, and 42 to provide the rectified output at the lines 52 and 54. Line 52 is connected with the cathode of each of the rectifiers 56, 58, 60, 62, 64, and 66. Two of these six rectifiers are connected to each secondary winding respectively at the two ends thereof. Rectifiers 56 and 58 are connected to the two ends of the secondary winding 30; rectifiers 60 and 62 are connected to the two ends of the secondary winding 36; rectifiers 64 and 66 are connected to the two ends of the secondary winding 42. Each of the secondary windings 30, 36, and 42 is center tapped, and the center taps of the three windings are commonly connected with the line 54. Secondary winding 30 is center tapped at a point 68, secondary winding 36 is center tapped at a point 70, and secondary winding 42 is center tapped at a point 72. As shown in the schematic, the three center tapped points 68, 70, and 72 are all electrically connected with the line 54.

Figure 3:
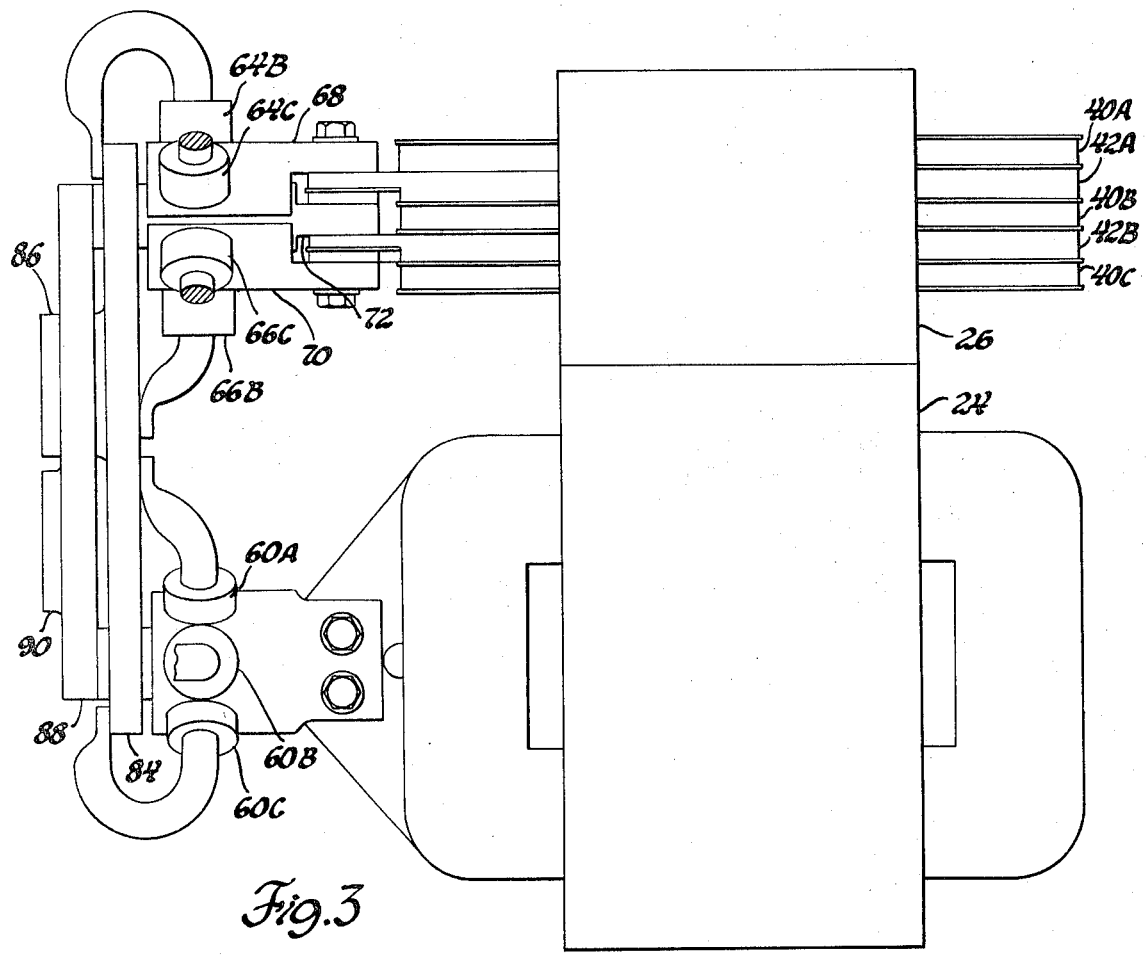
FIG. 3 is a side elevation view of the three-phase transformer-rectifier assembly of the present invention.
Figure 4:
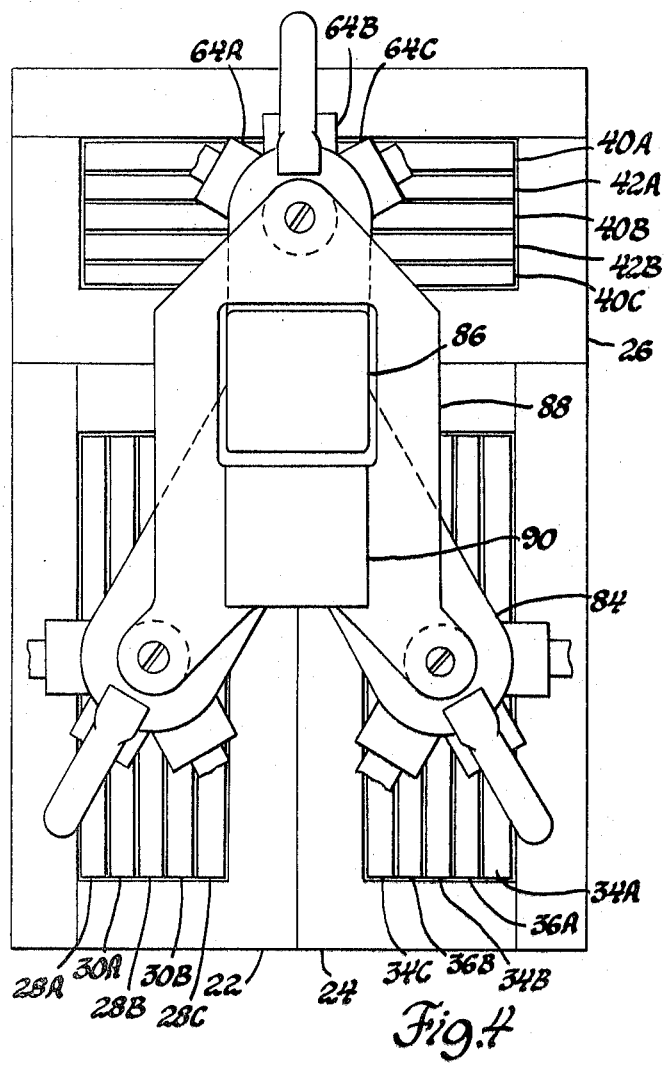
FIG. 4 is a front elevation view of the three-phase transformer-rectifier assembly of the present invention.

FIGS. 3 and 4 illustrate a three-phase transformer-rectifier assembly constructed in accordance with the schematic of FIG. 2. As illustrated two of the transformer cores are disposed side by side with the third transformer core disposed adjacent the ends thereof. Each of the primary windings 28, 34, and 40 of the schematic of FIG. 2 is divided into three sections or coils in the assembly of FIGS. 3 and 4. The three sections of the primary winding 28 are labeled 28A, 28B, and 28C; the three sections of the primary winding 34 are labeled 34A, 34B, and 34C; the three sections of the primary winding 40 are labeled 40A, 40B, and 40C. The three sections of each primary winding are electrically connected to constitute the single winding of that primary. Each of the secondary windings 30, 36, and 42 comprises two secondary winding sections or coils respectively designated 30A and 30B, and 36A and 36B, and 42A and 42B.

Figure 6:
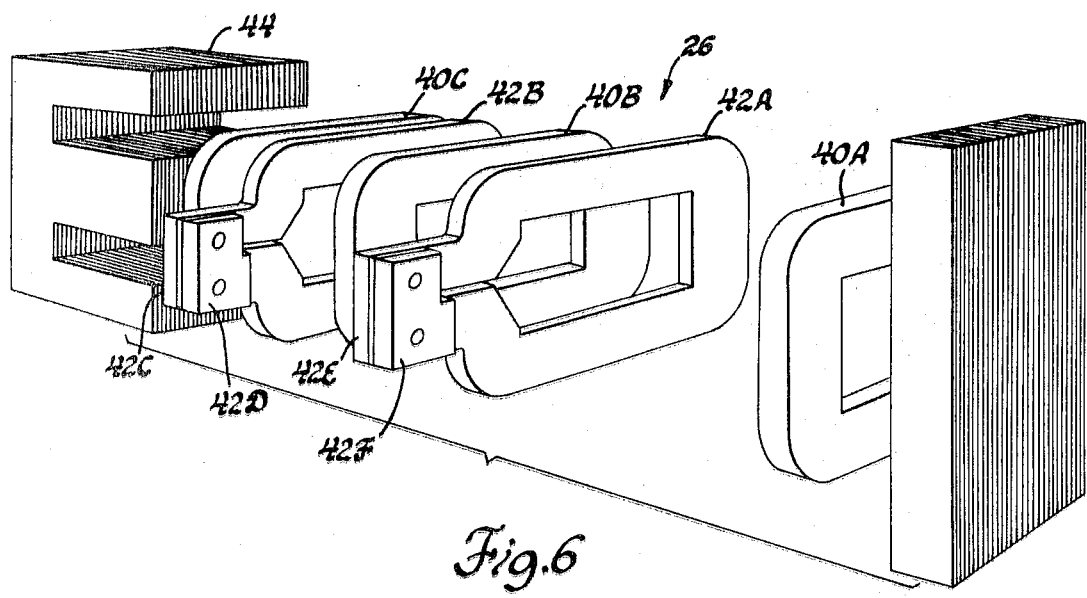
FIG. 6 is an exploded view of a single-phase transformer with windings of the type used in each of the single-phase transformer-rectifier assemblies of FIG. 4.

The structure of each of the three single-phase transformers of FIGS. 3 and 4 is best illustrated in FIG. 6 where the transformer 26 is shown in an exploded view. Both the primary and secondary windings of the transformer are carried on the center leg of the E-frame core 44. The laminations of the core 44 are fabricated from transformer iron in a manner generally known in the art. The three-section primary winding comprises three electrically connected coil sections 40A, 40B, and 40C wound, in the illustrated preferred embodiment, from copper strap having dimensions on the order of 0.10 inches by 0.75 inches. The total number of turns in the combined three sections of the primary winding 40 is on the order of 88 turns in the preferred embodiment. The secondary winding 42 is in two sections designated 42A and 42B each of which is a single turn of a copper conductor having dimensions in cross section on the order of 0.62 inches by 3.75 inches in the preferred embodiment. Each turn of the secondary winding is provided with two contact surfaces for engagement with the transformer terminals as described more fully hereinafter. These contact surfaces are designated 42C, 42D, 42E, and 42F in FIG. 6. The overall dimensions of the transformer 26 are on the order of 40 inches by 18 inches by 9 inches.

As best illustrated in FIG. 3, first, second, and third terminals 68, 70, and 72 are electrically connected to the secondary winding 42 respectively at the two ends and the center thereof. These three terminals are spatially located substantially immediately adjacent the periphery of the secondary winding 42. Three terminals corresponding to the terminals 68, 70, and 72 connected to the secondary winding 42 are connected with each of the secondary windings 30 and 36. The design of the three terminals 68, 70, and 72 is best shown in the exploded view of FIG. 5. The terminals 68 and 70 are symmetrical hemi-cylindrical sections provided with flat contact surfaces 74 and 76 adapted for electrical contact respectively with the contact surfaces 42C and 42F of the secondary winding 42 illustrated in FIG. 6. The cylindrical terminal 72 is provided with two flat surfaces 78 and 80 adapted for electrical contact respectively with the contact surfaces 42D and 42E of the secondary winding 42 at the electrical center thereof. The three terminals 68, 70, and 72 are designed for concentric assembly when connected to the secondary winding 42. Thus the terminal 72 is adapted to be received in cylindrical recesses provided in both the terminals 68 and 70. An insulating layer 82 carried on the periphery of the cylindrical portion of terminal 72 ensures against an electrical fault at the terminals. As shown in FIG. 3, the three terminals 68, 70, and 72 are attached to the secondary winding by means of two bolts. These bolts are provided with insulating sleeves and insulating washers which can be fabricated from any suitable material including, for example, linen base phenolic.

Figure 5:
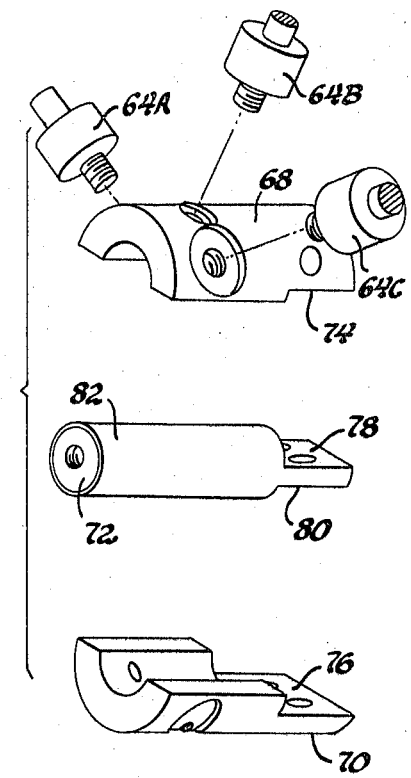
FIG. 5 is an exploded view of the terminal and rectifier assembly used in each single-phase transformer-rectifier assembly of FIG. 4.

The rectifiers illustrated schematically in FIG. 2 are carried by the terminals connected at the ends of the secondary windings 30, 36, and 42. Thus the rectifier 64 is carried by the terminal 68. In the preferred embodiment three diodes designated 64A, 64B, and 64C are electrically parallel to carry current from the secondary winding 42. These three diodes 64A, 64B, and 64C are the equivalent of the rectifier 64 shown in FIG. 2. As illustrated in FIG. 5, the three diodes are threaded into the terminal 68 thereby effecting both electrical contact and thermal contact such that the terminal 68 operates as a heat sink for the diodes as well as an electrical terminal for the winding 42.

The diodes 64A, 64B, and 64C and the corresponding diodes providing the function of rectifiers 56, 58, 60, 62, and 66 are electrically connected to a conductor bus 84. As illustrated in FIG. 3, conductor wires extend from the ends of the diodes not connected with the terminals of the secondary windings, i.e. the cathodes of the diodes, to the connector bus 84 where they are mechanically and electrically connected by means of threaded fasteners (not illustrated). As shown in FIGS. 3 and 4, the conductor bus 84 includes a substantially square shaped terminal post 86 which is the equivalent of the output line 52 of FIG. 2. As illustrated in FIG. 4, the conductor bus 84 is Y-shaped, although the shape forms no part of the present invention.

A second conductor bus 88 is secured to the ends of the three terminals connected to the electrical centers of the secondary windings 30, 36, and 42. These three terminals pass through the conductor bus 84 and are secured by threaded fasteners to the conductor bus 88. The conductor bus 88, like the conductor bus 84, includes a square terminal post 90. Both the conductor bus 84 and the conductor bus 88 are fabricated from copper, and the terminals connected to the conductor bus 88 are electrically insulated from the conductor bus 84 through which they pass.

Connection from the terminal posts 86 and 90 to the welding head of the welder supplied therefrom is accomplished either by a connector directly connected to the terminal posts or through intermediate terminals connected directly to the terminals posts. The three-phase transformer-rectifier assembly illustrated and described in useful in various welders including those with portable welding heads and those of fixed welding head design. Accordingly, the connection from the terminal posts 86 and 90 to the welding head is variable. In the preferred embodiment, the cable supplying the welding head connects directly to the terminal posts.

The coaxial arrangement of the three terminals connected with each secondary winding of the three-phase transformer-rectifier assembly of the present invention provides several distinct advantages. First, the proximity of the three terminals with one another is beneficial with regard to current distribution in the terminals; the coaxial configuration has a positive and beneficial influence with respect to both skin effect and proximity effect phenomena. Further the coaxial design, and the current distribution associated therewith, permits placement of the rectifying diode array at a position where the diodes carry equal currents, if the diodes have substantially identical characteristics; in fact, current has been equally distributed between as many as sixteen diodes on a single terminal without auxiliary equalizing networks.

Although the foregoing has proceeded in terms of a particular preferred embodiment, it is to be understood that various modifications and changes could be engrafted thereon by one skilled in the art within the spirit and scope of the appended claims.

The embodiments of the invention in which an exclusive property of privilege is claimed are defined as follows:

1. In a manually operated direct current welder having a portable welding head and a three-phase transformer-rectifier assembly comprising the single-phase transformer-rectifier assemblies comprising first, second, and third terminals electrically connected to the secondary winding respectively at the two ends and the center thereof, said first, second, and third terminals being mechanically attached and electrically connected, without any intervening conductor structure, directly to said secondary winding and said first, second, and third terminals being spatially located substantially immediately adjacent the periphery of the secondary winding, and first and second rectifiers carried by said first, second, and third terminals substantially immediately adjacent the periphery of the secondary winding and electrically and mechanically connected to said terminals to provide full-wave rectified voltage substantially at the periphery of the secondary winding.

2. An improved transformer-rectifier assembly as in claim 1, wherein said first and second rectifiers are carried respectively by said first and second terminals electrically connected to the secondary winding at the two ends thereof.

3. An improved transformer-rectifier assembly as in claim 2, wherein said third terminal electrically connected to the secondary winding at the center thereof includes a cylindrical portion and wherein said first and second terminals electrically connected to the secondary winding at the two ends thereof include portions comprising symmetrical hemi-cylindrical sections adapted to be concentrically assembled with the cylindrical portion of said third terminal in which assembly each of said first, second, and third terminals is electrically isolated from the other two of said terminals.

4. An improved transformer-rectifier assembly as in claim 3, including a conductor bus connected to said third terminal electrically connected to be secondary winding at the center thereof and similarly connected to the corresponding terminals of the other two single-phase transformer-rectifier assemblies constituting said three-phase transformer-rectifier assemblies.

5. An improved transformer-rectifier assembly as in claim 4, including a conductor bus connected to said first and second rectifiers at the ends thereof opposite the connections of said first and second rectifiers with said first and second terminals and similarly connected with the corresponding rectifier terminals of the other two single-phase transformer-rectifier assemblies constituting said three-phase transformer-rectifier assembly.

6. An improved transformer-rectifier assembly as in claim 5, wherein said conductor busses include terminal posts from which the portable welding head is supplied full-wave rectified voltage.

7. An improved transformer-rectifier assembly as in claim 6, wherein the secondary winding comprises two single turns.

8. An improved transformer-rectifier assembly as in claim 7, wherein the primary winding comprises three coils disposed on the transformer core such that each single turn of the secondary winding is sandwiched between coils of the primary winding.

9. An improved transformer-rectifier assembly as in claim 8, wherein the transformer has an E-frame core.

10. A welding transformer-rectifier assembly comprising a transformer core, a primary winding, a secondary winding, first and second terminals electrically spaced on said secondary winding, said first and second terminals being mechanically attached and electrically connected, without any intervening conductor structure, directly to said secondary winding and said first and second terminals being spatially located substantially immediately adjacent the periphery of said secondary winding, and a rectifier carried by one of said first and second terminals substantially immediately adjacent the periphery of the secondary winding and electrically and mechanically connected to that terminal to provide rectified voltage substantially at the periphery of the secondary winding.

11. A welding transformer-rectifier assembly as in claim 10, including a third terminal electrically spaced on said secondary winding from said first and second terminals such that said first, second, and third terminals are electrically connected to the secondary winding respectively at the two ends and the center thereof and spatially located substantially immediately adjacent the periphery of the secondary winding.

12. A welding transformer-rectifier assembly as in claim 11, including a second rectifier wherein said first and second rectifiers are electrically and mechanically connected to said terminals to provide full-wave rectified voltage substantially at the periphery of said secondary winding.

13. A welding transformer-rectifier assembly as in claim 12, wherein said first and second rectifiers are carried respectively by said first and second terminals electrically connected to said secondary winding at the two ends thereof.

14. A welding transformer-rectifier assembly as in claim 13, wherein each of said first and second rectifiers comprises a plurality of diodes.

15. A welding transformer-rectifier assembly as in claim 14, wherein said third terminal electrically connected to said secondary winding at the center thereof includes a cylindrical portion and wherein said first and second terminals electrically connected to the secondary winding at the two ends thereof include portions comprising symmetrical hemi-cylindrical sections adapted to be concentrically assembled with the cylindrical portion of said third terminal in which assembly each of said first, second, and third terminals is electrically isolated from the other two of said terminals.

16. A welding transformer-rectifier assembly as in claim 15, including a conductor bus connected to said third terminal electrically connected to said secondary winding at the center thereof and adapted to be connected to the corresponding terminal of another substantially identical welding transformerrectifier assembly.

17. A welding transformer-rectifier assembly as in claim 16, including a conductor bus connected to said diodes at the ends thereof opposite the connections of said diodes with said first and second terminals and adapted to be connected with the corresponding diodes of another substantially identical transformer-rectifier assembly.

18. A welding transformer-rectifier assembly as in claim 17, wherein said first and second terminals function as heat sinks for said diodes, said transformer core is an E-frame core, said secondary winding comprises two single turns, said primary winding comprises three coils disposed on the transformer core such that each single turn of said secondary winding is sandwiched between two coils of said primary winding, and said first and second terminals function as heat sinks for said diodes.

19. A welding transformer-rectifier assembly as in claim 14, wherein substantially equal currents are carried by each of the diodes in the pluality of diodes of said first rectifier and wherein substantially equal currents are carried by each of the diodes in the plurality of diodes of said second rectifier.

* * * * *